F. V. UBEZZI.
VEHICLE WHEEL.
APPLICATION FILED OCT. 27, 1914.
1,188,861.
Patented June 27, 1916.
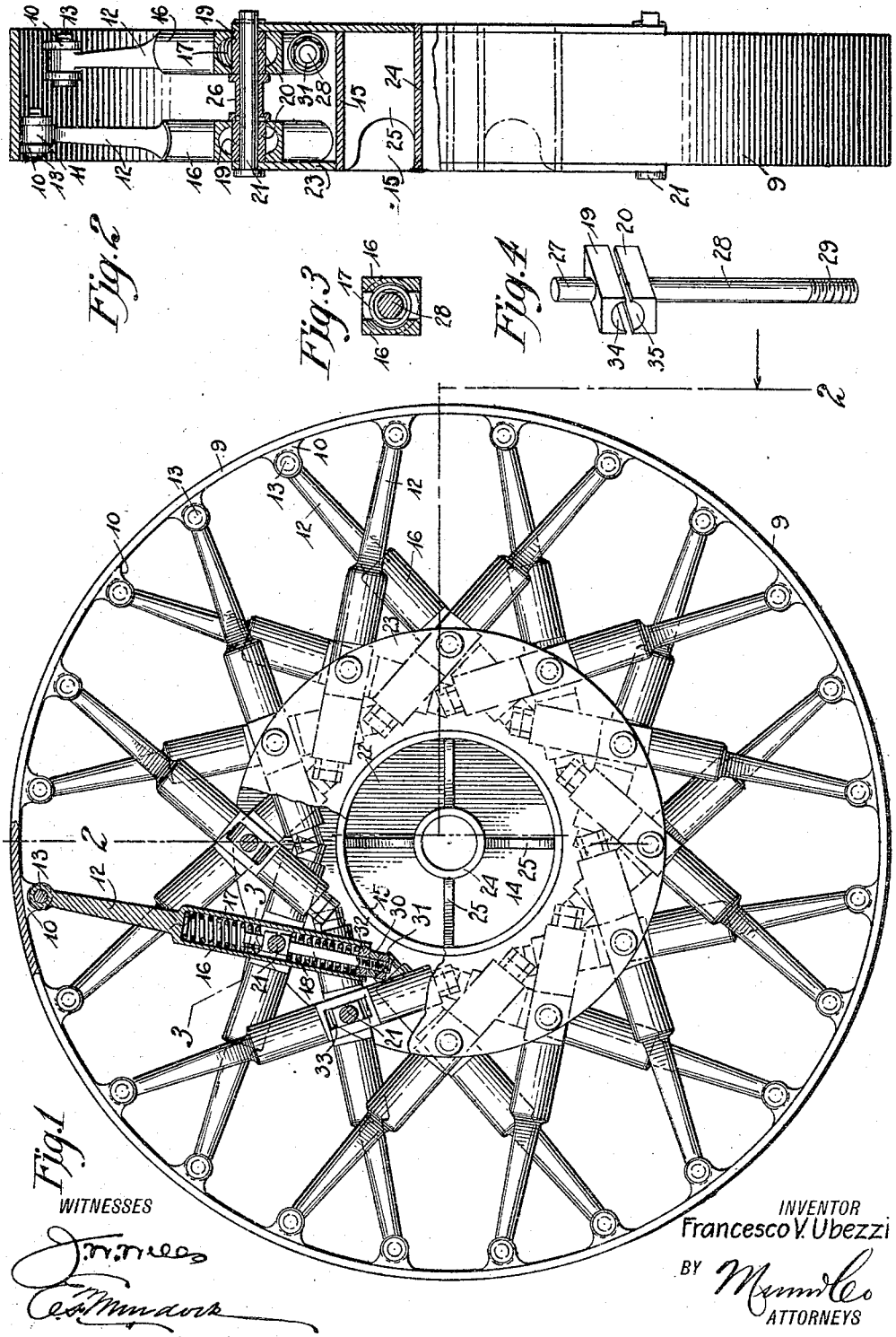

UNITED STATES PATENT OFFICE.

FRANCESCO V. UBEZZI, OF NEW YORK, N. Y., ASSIGNOR TO TRANSCONTINENTAL WHEEL CO., INC., OF NEW YORK, N. Y., A CORPORATION OF NEW YORK.

VEHICLE-WHEEL.

1,188,861.  Specification of Letters Patent.  Patented June 27, 1916.

Application filed October 27, 1914. Serial No. 868,819.

*To all whom it may concern:*

Be it known that I, FRANCESCO V. UBEZZI, a subject of the King of Italy, and a resident of the city of New York, borough of Manhattan, in the county and State of New York, have invented a new and Improved Vehicle-Wheel, of which the following is a full, clear, and exact description.

Among the principal objects which the present invention has in view are: to provide a wheel of the character mentioned having a rigid rim and a floating hub, with resilient means for normally holding said hub concentric to said rim, to distribute the traffic strains between said rim and hub to accommodate a variety of traffic conditions; to avoid collapsing of the structure incident to side thrust thereon; and to provide means for varying the resilient tension of the structure connecting said rim and said hub.

*Drawings.*—Figure 1 is a side view of a wheel constructed and arranged in accordance with the present invention, part of the structure being cut away to disclose the mounting of the wheel spokes and of the cushioning devices therefor; Fig. 2 is a vertical section taken on the line 2—2 in Fig. 1; Fig. 3 is a cross section taken as on the line 3—3 in Fig. 1; Fig. 4 is a detail view on an enlarged scale, showing the tension-adjusting mechanism employed for varying the action of the cushions in the wheel spokes.

*Description.*—As seen in the accompanying drawings, the felly rim 9 is constructed from suitable rigid material and is relatively wide-spread. At regular intervals, and preferably in staggered relation, are formed a series of knuckle lugs 10, between which are disposed the eyeleted end 11 of each of a series of spokes 12. The spokes 12 are pivotally mounted in the lugs 10 by pivot bolts or rivets 13. As seen best in Fig. 1 of the drawings, the spokes 12, on opposite sides of the central plane of the wheel, are inclined in relatively the same circular direction. Said spokes are disposed tangential to the hub 14 and to the flange 15 thereof.

The spokes 12 have a solid end section integrally formed with a hollow tubular section 16. The tubular section 16 forms a housing for springs 17 and 18. The section 16 of each spoke is enlarged approximately at the center thereof to form a square housing for saddle blocks 19 and 20. Said blocks are matched and are each grooved to rest upon one of the bolts 21.

The bolts 21 are elongated and pass through perforations provided in face plates 22 and 23. The face plate 22, as shown best in Fig. 2 of the drawings, is centrally perforated to receive the inner end of a hub journal housing, 24. The housing 24 and flange 15 are structurally connected by webs 25, which webs are radially disposed with reference to the housing 24. Each of the bolts 21 forms pivots for two of the spokes 12. The blocks 19 and 20 in each of the sections 16, together with thimbles 26, hold the plates 23 and 22 in spaced relation. The blocks 19 and 20 are primarily designed to form seats for the springs 17 and 18. To this end the blocks 19 are each provided with short stud pins 27, while the blocks 20 are each furnished with an elongated bolt 28. The bolts 28 have each a screw-threaded end 29, upon which are mounted nuts 30 and a lock nut 31. The nuts 30 each bear upon a closure cap 32. The caps 32 are employed to close the otherwise open end of each of the sections 16. The caps 32 are each centrally perforated to freely pass one of the bolts 28.

The number of spokes 12 employed is optional with the designer of wheels of the character described. When equipping each of the spokes and the section 16 thereof with the springs 17 and 18 and with the blocks 19 and 20, the following plan is adopted: The springs 17 and 18 are primarily placed in each section 16. The bolt 28 and block 20 connected therewith are next introduced through one of the elongated side openings 33. The spring 17 being lifted, the bolt 28 is placed in position and the spring 18 dropped thereover, as shown best in Fig. 1 of the drawings. When the bolt 28 is properly disposed, the cap 32 is introduced over the threaded end thereof and caused to engage the internal threads at the end of the section 16. The nut 30 is next mounted on the threaded end 29 of the bolt 28 and set up until it bears on the face of the cap 32 to contract the spring 18. The spring 18 yields against the pressure of the nut 30 until the block 20 is removed from position to interfere with the introduction of the block 19 and the short stud pin 27. With any hand tool the spring 17 is lifted to permit the introduction of the pin 27. The block 19 and pin 27 having been thus introduced, the grooves 34 and 35 of the blocks 19 and 20 are disposed in line with the openings 33, to receive the bolts 21.

The spokes 12 and sections 16 thereof having been thus equipped, each of the spokes is placed in operative position between the plates 22 and 23. The rim 9 is then adjusted to enfold the various spokes which are rotated on the bolts 21 until the eyeleted end of each spoke registers with perforations in the lugs 10 to receive the various bolts or rivets 13. To make this adjustment, it will be understood, the spring 17 in each spoke is compressed. By reference to Fig. 1 of the drawings, it will be noted that the springs 17 of one set of spokes tend to rotate the rim 9 in a direction opposed to that in which the springs 17 in the opposite set of spokes tend to rotate said rim. The springs 17 thus counterbalance each other and hold the rim 9 in concentric relation to the hub 14.

The spokes 12 having been adjusted, the nuts 30 are tightened to contract the springs 18, drawing upon the bolts 28 for this purpose. The springs 18 coöperate with the springs 17 at opposite sides of the radial planes coincident with the axis of the hub of the wheel. Thus, if weight is imposed on the hub, tending to force the same downward, the springs 17 on the lower side of the wheel are compressed, the bolts 21 forcing the blocks 19 and springs 17 thereof downward or toward the ground. At the upper side of the wheel, the bolt 21 resting in the flanges 22 and 23, and blocks 20, forces downward on said blocks and the springs, which rest upon the various caps 32 in the sections 16 of the spokes. When it is desired to increase or diminish the resiliency of the wheel, this may be achieved by setting up the caps 32 and the nuts 30 and 31. The action of each of the springs 18 is thus varied to suit the various conditions of traffic.

By referring to Fig. 2 of the drawings, it will be seen, the two series of spokes 12 are oppositely arranged in the rim 9, and the lower ends of the sections 16 bear each on one of the plates 22 or 23, being held in guided relation thereby. Thus it will be seen that any thrust transfers to the plane of the wheel imposed on the rim 9 would be fully resisted by the wheel.

Claim:

A wheel as characterized comprising, a plurality of face plates rigidly connected in spaced relation; a plurality of tubular sections arranged in pairs, each member of each pair bearing against to be guided by one of said face plates; a plurality of pivot bolts mounted in said face plates and forming pivots for said tubular sections; a plurality of springs mounted in said sections for normally maintaining said sections in relation to said pivot bolts; a rigid felly rim; and means for pivotally connecting each of said tubular sections and said felly rim, the pivotal connection of each of said sections being adjacent the side edge of said felly rim.

In testimony whereof I have signed my name to this specification in the presence of two subscribing witnesses.

FRANCESCO V. UBEZZI.

Witnesses:
HENRY ORSENIGO,
EUGENE J. ORSENIGO.

Copies of this patent may be obtained for five cents each, by addressing the "Commissioner of Patents, Washington, D. C."